(12) United States Patent
Feldman et al.

(10) Patent No.: US 12,124,761 B2
(45) Date of Patent: Oct. 22, 2024

(54) MULTI-GROUP COLLABORATION SYSTEM AND ASSOCIATED METHODS

(71) Applicant: T1V, Inc., Charlotte, NC (US)

(72) Inventors: Michael R. Feldman, Charlotte, NC (US); James E. Morris, Lake Wylie, SC (US); John Jack Wiltshire, Pearland, TX (US)

(73) Assignee: T1V, INC., Charlotte, NC (US)

( * ) Notice: Subject to any disclaimer, the term of this patent is extended or adjusted under 35 U.S.C. 154(b) by 73 days.

(21) Appl. No.: 17/225,145

(22) Filed: Apr. 8, 2021

(65) Prior Publication Data

US 2021/0224021 A1    Jul. 22, 2021

Related U.S. Application Data

(63) Continuation of application No. 16/620,291, filed as application No. PCT/US2018/036639 on Jun. 8, 2018, now Pat. No. 10,976,984.

(60) Provisional application No. 62/517,009, filed on Jun. 8, 2017.

(51) Int. Cl.
G06F 3/14 (2006.01)
(52) U.S. Cl.
CPC ................ G06F 3/1454 (2013.01)
(58) Field of Classification Search
CPC .. G09G 2370/02; G09G 2370/16; G09G 5/14; H04L 65/403; H04L 65/4076; H04N 7/147; H04N 7/15; G09B 5/14; G06F 3/1454
USPC ....................................................... 709/204
See application file for complete search history.

(56) References Cited

U.S. PATENT DOCUMENTS

| | | | |
|---|---|---|---|
| 6,272,545 B1 * | 8/2001 | Flanagin | G06Q 10/10 |
| | | | 709/227 |
| 6,567,984 B1 * | 5/2003 | Allport | H04N 21/4622 |
| | | | 348/E5.103 |
| 7,028,264 B2 * | 4/2006 | Santoro | H04M 1/72427 |
| | | | 715/729 |
| 9,323,713 B2 * | 4/2016 | Liansky | G06F 15/16 |

(Continued)

OTHER PUBLICATIONS

International Search Report and Written Opinion dated Aug. 31, 2018 for PCT/US2018/036639.

(Continued)

*Primary Examiner* — Wing F Chan
*Assistant Examiner* — John Fan
(74) *Attorney, Agent, or Firm* — XSENSUS LLP

(57) ABSTRACT

A collaboration system includes a first group display and a first group display computer, the first group display computer to receive mobile device data streams from at least two mobile devices over a wireless access protocol and to output a first group display data stream over a network, a second group display and a second group display computer, the second group display computer to receive mobile device data streams from at least two mobile devices, different from the at least two mobile devices streaming to the first group display computer, over the wireless access protocol and to output a second group display data stream over the network, a common display computer to receive the first and second group display data streams from the network, and a common display to display data streamed from the first and second group display computers in first and second group display windows.

16 Claims, 14 Drawing Sheets

(56) References Cited

U.S. PATENT DOCUMENTS

| | | | |
|---|---|---|---|
| 9,591,479 B1* | 3/2017 | Leavy | H04L 9/0833 |
| 9,743,119 B2* | 8/2017 | Todd | H04N 21/4753 |
| 9,866,860 B2* | 1/2018 | Lewis | H04N 19/23 |
| 2008/0303746 A1* | 12/2008 | Schlottmann | G07F 17/32 |
| | | | 463/16 |
| 2010/0138780 A1 | 6/2010 | Marano et al. | |
| 2011/0199389 A1 | 8/2011 | Lu et al. | |
| 2012/0287022 A1 | 11/2012 | Queen | |
| 2013/0073387 A1 | 3/2013 | Heath | |
| 2013/0219295 A1 | 8/2013 | Feldman et al. | |
| 2014/0195594 A1* | 7/2014 | Ahuja | A63F 13/355 |
| | | | 709/203 |
| 2014/0195675 A1* | 7/2014 | Silver | H04L 65/611 |
| | | | 709/224 |
| 2014/0368601 A1 | 12/2014 | deCharms | |
| 2015/0049250 A1 | 2/2015 | Shao et al. | |
| 2015/0121252 A1 | 4/2015 | Yerli | |
| 2015/0200985 A1 | 7/2015 | Feldman et al. | |
| 2016/0034114 A1 | 2/2016 | Lee et al. | |
| 2016/0216933 A1 | 7/2016 | Sitrick et al. | |
| 2016/0371048 A1 | 12/2016 | Morris et al. | |
| 2017/0099361 A1 | 4/2017 | Digilov et al. | |
| 2017/0201479 A1 | 7/2017 | Liu | |

OTHER PUBLICATIONS

Extended European Search Report issued Feb. 11, 2021 in European Patent Application No. 18813407.6, 13 pages.
Communication pursuant to Article 94(3) EPC issued in corresponding European Patent Application No. 18 813 407.6, 15 pages.

* cited by examiner

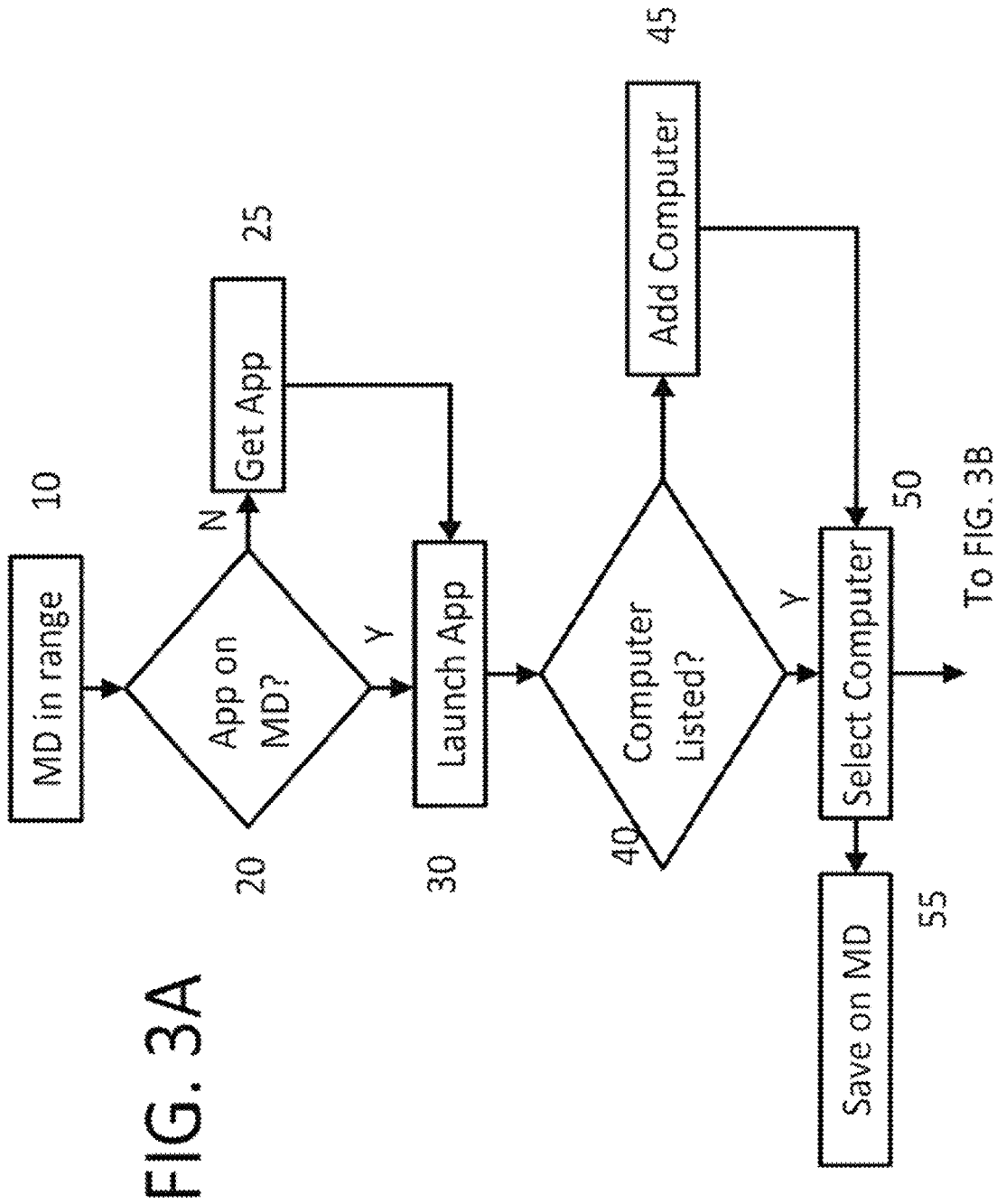

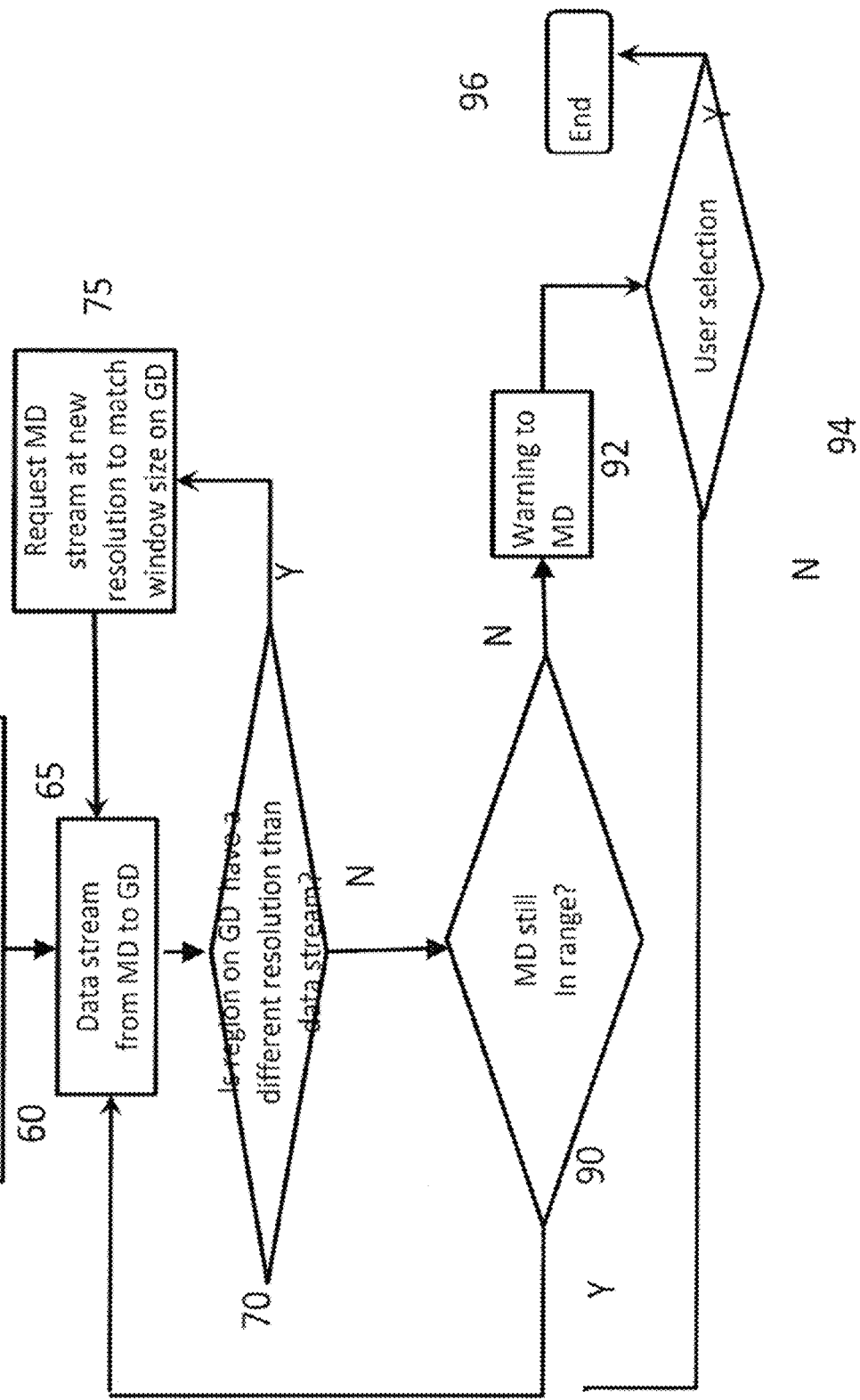

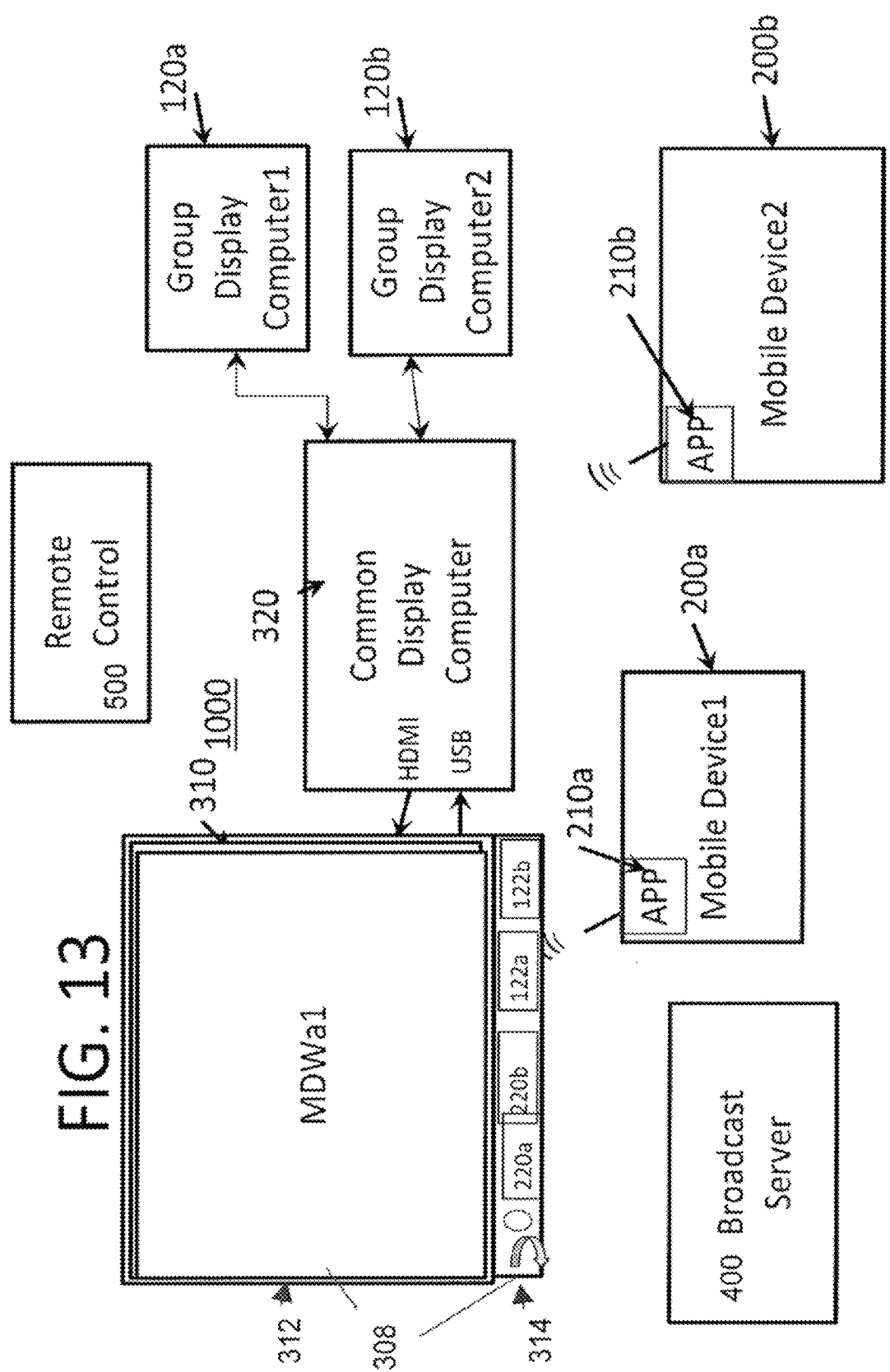

MULTI-GROUP COLLABORATION SYSTEM AND ASSOCIATED METHODS

CROSS-REFERENCE TO RELATED APPLICATIONS

The present application is a continuation of U.S. patent application Ser. No. 16/620,291 filed Dec. 6, 2019, which is based on U.S. national phase application PCT/US2018/036639, filed Jun. 8, 2018, which claims priority under 35 U.S.C. § 119(e) to U.S. Provisional Application No. 62/517,009, filed on Jun. 8, 2017, and entitled: "Multi-Group Collaboration System and Associated Methods," each of which is incorporated herein by reference in its entirety.

BACKGROUND

Collaboration is becoming increasingly critical in numerous scenarios, e.g., active learning scenarios. As discussed in detail below, embodiments are directed to a bring your own device (BYOD) collaboration system that is simple yet supports many different platforms, e.g., is hardware agnostic. Thus, a myriad of collaboration options may be realized with one seamless user experience. In particular, rather than relying on hardware solutions and physical connections, embodiments are directed to software solutions that work seamlessly across a myriad of devices.

SUMMARY

One or more embodiments is directed to a collaboration system, including a first group display and a first group display computer, the first group display computer to receive mobile device data streams from at least two mobile devices over a wireless access protocol and to output a first group display data stream over a network, a second group display and a second group display computer, the second group display computer to receive mobile device data streams from at least two mobile devices, different from the at least two mobile devices streaming to the first group display computer, over the wireless access protocol and to output a second group display data stream over the network, a common display computer to receive the first and second group display data streams from the network, and a common display to display data streamed from the first and second group display computers in first and second group display windows.

The common display may broadcast data in the first group display window to the second group display computer or data in the second group display window to the first group display computer.

The common display computer may broadcast a first window on the common display to the first and second group displays.

The first window on the common display may be one of the first and second group display windows.

The common display computer may select which of the first and second group display window dominate the common display.

Ethernet cables may connect the first and second group display computers and the common display computer to the network.

One or more embodiments is directed to a collaboration system that includes N group displays and N group display computers, where N is a natural number greater than two, each of the group display computers capable of receiving mobile device data streams from at least M mobile devices, different from mobile devices of other group display computers, where M is a natural number greater than two, over a wireless access protocol and to output a group display data stream over a network; a network to receive N group display data streams, a common display computer to receive the N group display data streams from the network, and a common display to display data streamed from any one of the N group display computers in a group display window or full screen.

The common display to display data may be streamed from multiple group display computers in multiple group display windows simultaneously.

The common display computer may broadcast data in a first group display window of the N group display windows to N−1 group display computers other than the first group display window.

One of the group display computers and common display computer may broadcast data in a first group display window of the N group display windows to N−1 group display computers other than the first group display window.

The common display to display data may be streamed from the N group display computers in N group display windows simultaneously.

The common display computer may broadcast a first window on the common display to any one or more of the N group display computers.

The common display computer may select which of N group display windows dominate the common display.

Ethernet cables may connect the N group display computers and the common display computer to the network.

The common display computer may broadcast a second window on the common display to P group display computers, P is a natural number between 1 and N−1. The P group display computers to receive the second window may be selected through touch mechanisms on the common display, may be controlled by the common display computer, and/or controlled by the common display computer and the group display computers.

One or more embodiments is directed to a method of connecting a mobile device to a common display associated with a common display computer controlling the common display, via a group display associated with a common display computer having presentation software. For each mobile device, the method may include downloading a display application onto the mobile device, selecting a group display computer in the display application, connecting the mobile device to the group display computer, selecting, on the mobile device, what is to be displayed on the group display, sending a data stream of the selection to the group display computer to be displayed in a window on the group display corresponding to the mobile device. The group display computer may determine a first resolution (R1) of the data stream sent by the mobile device to the group display computer, determine a region in which the data stream is to be presented and a second resolution (R2) associated therewith, and when R2 is less than R1, then sending a third resolution (R3) to the mobile device, where R1>R3>=R2. The display application on the mobile device may down sample the selection in accordance with the resolution, R3, and only transmitting the down sampled resolution (R3) to the group display computer; and sending a data stream of the group display computer to the common display computer to be displayed in a window on the common display corresponding to the group display computer. The common display computer may determine a first resolution (R1') of the data stream displayed by the group display computer on the group display, determine a region in which the data stream is to be presented and a second resolution (R2') associated therewith, and when R2' is less than R1', then sending a third resolution (R3') to the group display computer, where R1'>R3'>=R2', and the presentation software on the group display computer is to down sample the data stream in accordance with the resolution, R3', and only transmitting the data stream with the down sampled resolution (R3') to the common display computer.

BRIEF DESCRIPTION OF THE DRAWINGS

Features will become apparent to those of skill in the art by describing in detail exemplary embodiments with reference to the attached drawings in which:

FIGS. 3A and 3B illustrate flow chart of connecting a mobile device to a group display in accordance with embodiments;

FIGS. 11 to 13 illustrate block diagrams of a collaboration system operating in different modes in accordance with embodiments.

DETAILED DESCRIPTION

There are three primary components of a collaboration system in accordance with an embodiment. First is a sharing application, e.g., AirConnect™ application by T1V, that enables wireless device sharing from a user's mobile device, e.g., laptop, tablet, smartphone, etc., that may be used in any common operating system, e.g., Mac® OS, iOS®, Windows®, Android®, Linux®, etc. Second is presentation software, e.g., ViewHub™ application by T1V, that allows a number of devices to be connected to a single display using the sharing application, herein a Group Display. Third, is a collaboration software, e.g., ThinkHub™ application by T1V, that receives the image from one or more Group Displays that are running the presentation software, expands the physical area by using a digital canvas, and includes built-in applications to interact with the output from computers associated with one or more Group Displays on another, larger display, herein a Common Display. The Common Display may also be connected to an unlimited number of mobile devices running the sharing application.

Figure 1:
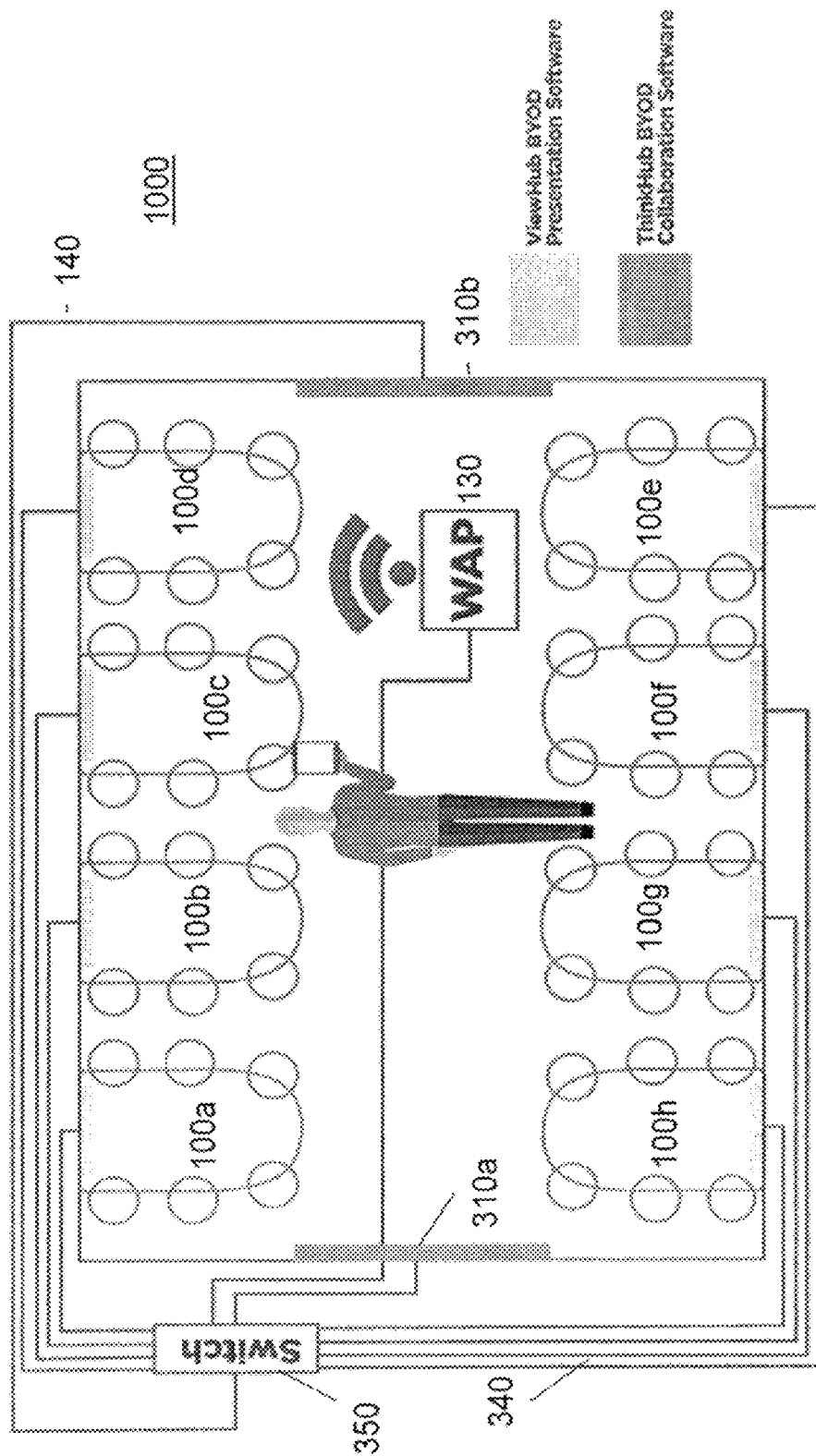
FIG. 1 illustrates a block diagram of a collaboration system in accordance with embodiments.

FIG. 1 illustrates a block diagram of a collaboration system 1000 in accordance with an embodiment. As shown therein, the collaboration system 1000 includes a plurality of Group Display system 100a to 100h, a wireless access point 130, a network switch 350, and two Common Displays 310a and 310b all on a network.

Each Group Display System 100 includes a Group Display 110 and Group Display Computer 120, described in detail below in connection with FIG. 3. Each Group Display Computer 120 runs the presentation software, described in detail below. One or more of the Group Display Systems 100a to 100h is connected, e.g., through the WAP 130, to one or more mobile devices (see FIG. 2) running the mobile application. Each Group Display 110 may display data from the one or more mobile devices connected thereto.

The Common Displays 310a and 310b may share a Common Display Computer 320, as described below in connection with FIG. 9. There may be one or more Common Displays connected to the Common Display Computer 320. The Common Display Computer 320 runs the collaboration software, described in detail below.

As shown in FIG. 1, each Group Display System is connected, e.g., through wires 140, e.g., Ethernet cables, or through wireless technology to a Computer Network. Each Group Display Computer 120 and each Common Display Computer 320 may form a node on the Computer Network. A network switch 350, may be used to facilitate the connections from each node to the Computer Network. For example, the Ethernet cables from multiple Group Display Computers 120 and from one or more Common Display Computer 320 may all be connected, e.g., through wires 340, e.g., Ethernet cables, to the network switch 350. One or more mobile devices may be connected through the WAP 130 to the Common Display Computer 320. Both Common Displays 310a and 310b may display any one or all of information connected thereto, e.g., from one or more of the Group Display Computers 120 or one or more mobile devices.

Typically, when sending video data from multiple sources to a display device, a matrix switch, e.g., a HDMI (High-Definition Multimedia Interface) matrix switch, or a video wall processor is used to control the flow of data, including the switching of the various video streams coming from each Group Display Computer and each Common Display Computer to each display However, this requires more hardware and is more expensive than controlling the flow of data (including performing the switching functions) with the Group Display Computers and Common Display Computers the via a Computer Network. Using the Group Display Computers and Common Display Computers via a Computer Network is more demanding on the Common Display Computers and Group Display Computers. For example, a matrix switcher may be able to switch any of the video sources to any output display. The processing power of the Common Display Computer can be reduced if only a limited number of switch modes are employed. For example, in a classroom setting, typical modes including all Group Display Computers to be sent to the Common display Computer and any one input source to be Broadcast to all displays or certain groups of displays. Further, the processing burden on the Common Display Computer 320 may need to be further reduced using down sampling, which would not be needed when using the matrix switch or the video wall processor. However, for many applications, these limitations are not an issue.

By having mobile devices connected to Common Display Computer 320 indirectly, i.e., through the Group Display Computers 120a to 120h, rather than directly to the Common Display Computer 320, the Group Display Computers 120a to 120h may output a single group display data stream, e.g., a 1080p data stream, containing the information from each of the mobile devices connected thereto, as discussed in detail below. Additionally, each Group Display Computer may receive up to M data streams, where M is a natural number greater than one. There may be N Group Display Computers and the Common Display Computer may receive N data streams, one from each Group Display Computers, where N is a natural number greater than 1. Thus, N group display data streams may have data streams from at least M mobile devices, e.g., unique mobile devices among the group displays, output as a single signal, to the Computer Network, which, in turn, outputs a common display data stream having at least two group display data streams as a single signal. If all of these mobile devices were to connect directly to the Common Display Computer 320, huge bandwidth issues would arise, as the Common Display Computer 320, would need to be capable of receiving N×M data streams. With the approach of this embodiment the Common Display Computer 320, only needs to be capable of receiving N data streams, rather than N×M data streams.

Figure 2:
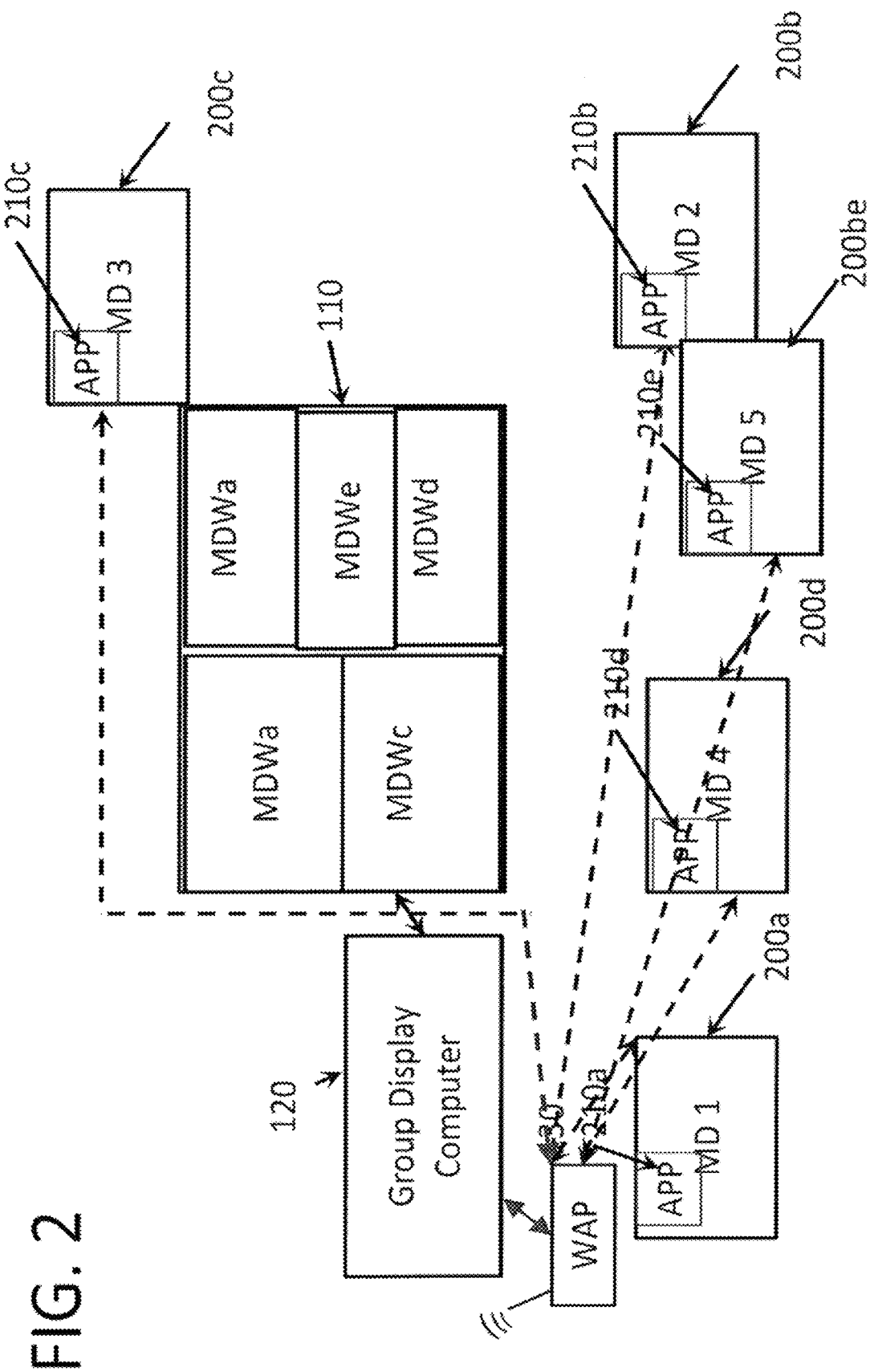
FIG. 2 illustrates a block diagram of a display system in accordance with embodiments.

FIG. 2 illustrates a block diagram of a Group Display system 100 interacting with one or more mobile devices 200a, 200b, and so forth. The Group Display 110 may be an LCD display, LED display, or other monitor that is capable of having an electronic video signal as an input and converting the input to a visual image. Additionally, the Group Display 110 may include a touch screen or other gesture input mechanism.

Figure 7:
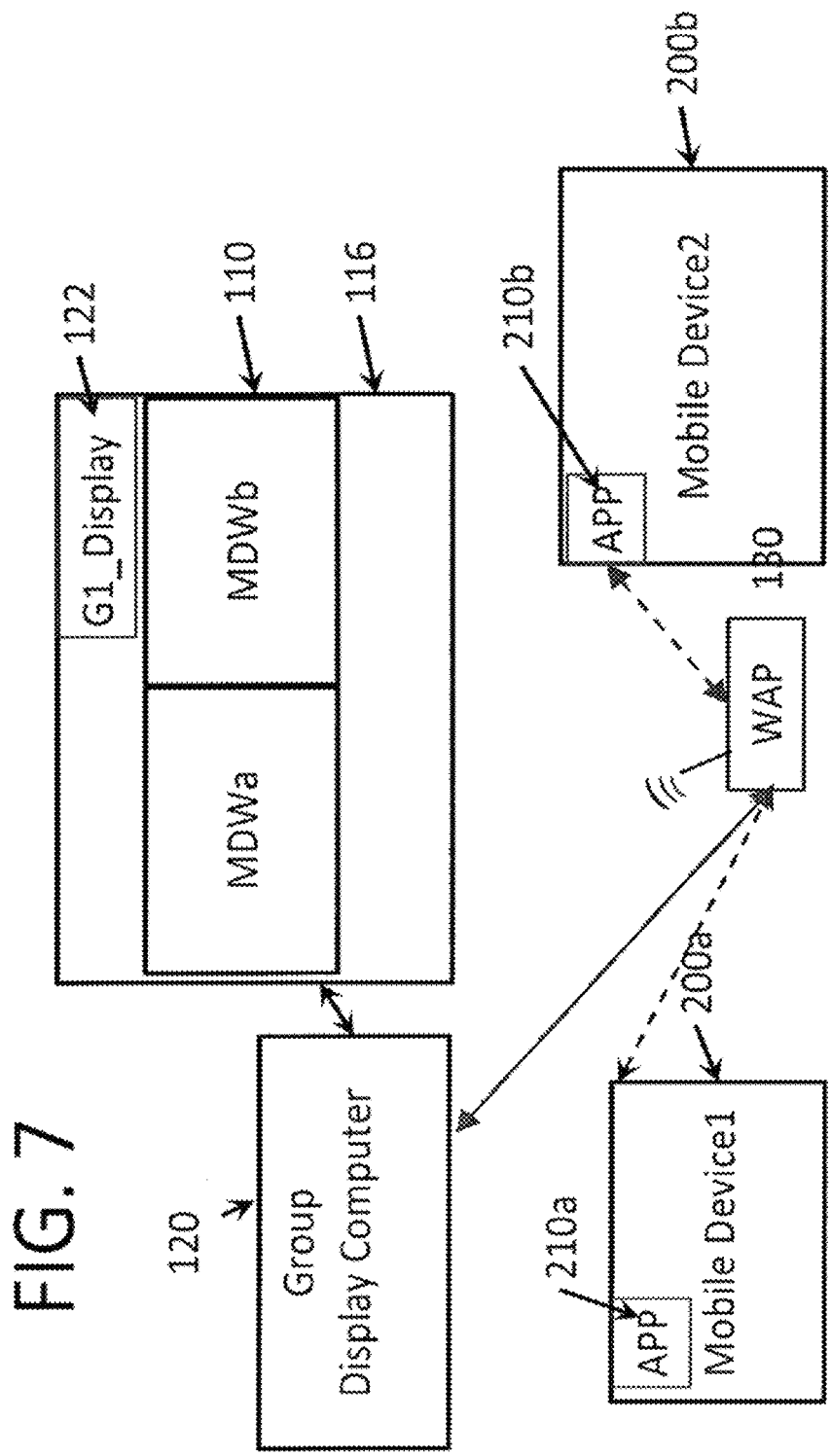

Information regarding a Machine Identifier 122 (see FIG. 7) of the Group Display Computer 120 and the digital information to be displayed on the Group Display 110 may be sent from the Group Display Computer 120 to the Group Display 110. The digital information from the mobile devices may be displayed within windows, e.g., Mobile Device Windows (MDWs).

Digital information from Mobile Device1 (200a) to Mobile Device5 (200e) is streamed from these Mobile Devices to the Group Display Computer 120 through the network. In FIG. 2, digital information is streamed from the mobile devices through the WAP 130 to the Display Computer 120. This streaming data may then be displayed in the Mobile Device Windows (MDW) on the Group Display 110.

Typically, the data streamed from the Mobile Device (200a to 200e) is a video signal that is the same as the signal displayed on the Mobile Device. This streaming data will be referred to as a Mobile Device Data Stream (MDDS). A MDDS is typically displayed within a MDW in the Group Display 110. Within or adjacent this MDW, there may also be displayed an identifier associated with the Mobile Device, e.g., the name of the MDDS, a name associated with the corresponding Mobile Device, the Mobile Device's owner, and so forth.

For use across all platforms, a user of a mobile device may download a sharing application 210a to 201e thereon to assist in connecting the to the display computer 120. The sharing application may be written for each common operating system and is herein referred to as an AirConnect™ App. Instructions for downloading the AirConnect™ App may be readily viewable, e.g., on or adjacent the common display 110, or a region to be scanned, e.g., a bar code, quick response (QR) code, and so forth, using a mobile device QR, so that once scanned, the AirConnect™ App would be downloaded. Once the AirConnect™ App is downloaded, then a user can launch the AirConnect™ App and then enter the Machine Identifier 122 associated common display 110. The Machine Identifier 122 may by an IP address or other alphanumeric code associated with the Display Computer 120. The Machine identifier 122 may be simply displayed on the Common Display 110, in which case the user of the AirConnect™ App may simply enter the Machine Identifier 122 when prompted by the AirConnect™ App on their Mobile Device.

Details of this are further disclosed in U.S. patent application Ser. No. 15/056,787, entitled "SYSTEM FOR CONNECTING A MOBILE DEVICE AND A COMMON DISPLAY," and U.S. patent application Ser. No. 15/184,814, entitled "REMOTE GESTURE CONTROL, INPUT MONITOR, SYSTEMS INCLUDING THE SAME, AND ASSOCIATED METHOD," both of which is incorporated herein in its entirety for all purposes.

Once the Machine Identifier 122 is entered, the AirConnect™ App may then use the Machine Identifier 122 to connect the Mobile Device directly to the display computer 120. Details of this are illustrated in FIGS. 3A and 3B, which is a flowchart of an operation of connecting Mobile Device(s) to the common display 110 in accordance with an embodiment.

In operation 10, a user walks within range of the display system 100 with a mobile device (MD) connected to a wireless network. If the AirConnect™ App is on the MD in operation 20, the user launches the AirConnect™ App in operation 30 on the MD. If not, then the user may be instructed, e.g., by a notice posted on or near the common display 110, to download the AirConnect™ App on the MD in operation 25, and then to proceed to launch the AirConnect™ App in operation 30.

Once launched, the AirConnect™ App may display a list of locally stored names and/or recently used connections on the mobile device. The Group Display 110 may also display the name or Machine Identifier 122 of the Group Display Computer 120 that it is connected to and/or the name of the Group Display 110 or Group Display Computer 120 may be posted near the Group Display 110. If the name associated with the Group Display 110 is not listed in the AirConnect™ App, the user may type a Machine Identifier 122 that may be continuously displayed on or near the Group Display 110 to add the Group Display Computer 120 to the list of FIG. 4 in operation 45.

Figure 4:
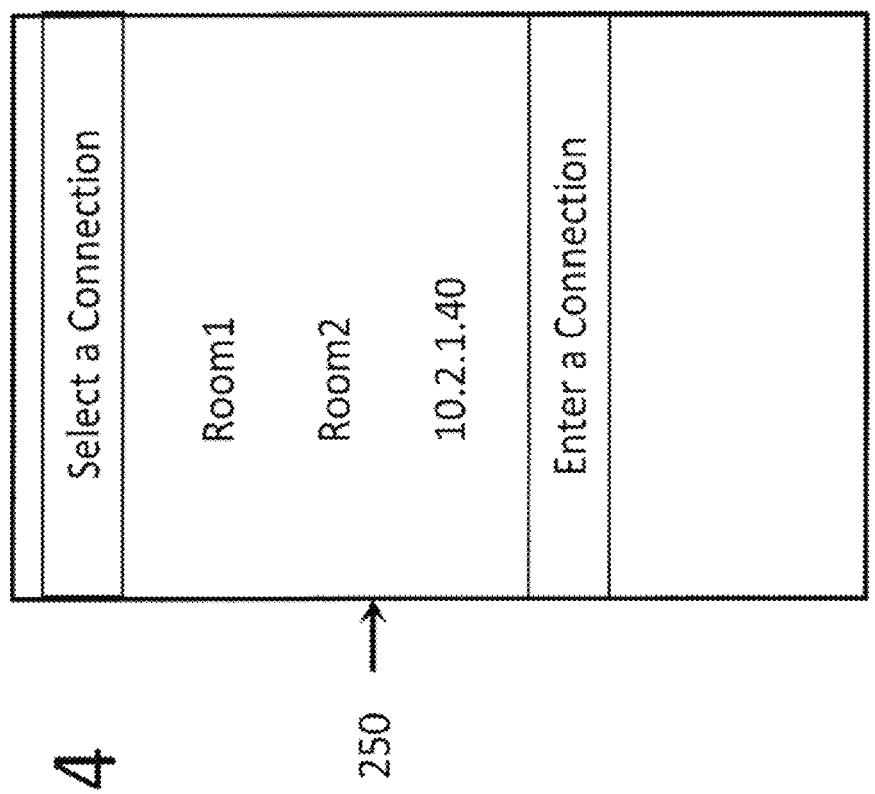
FIG. 4 illustrates a screen for connecting a mobile device in accordance with embodiments.

An example of a screen 250 that may appear when using the AirConnect™ App is shown in FIG. 4. Here, a user would be prompted to select which display to be connected with. These options may include a nickname for the Group Display that is visually apparent, the machine identifier of the Group display that is visually apparent, and so forth. The screen 250 for selection may look the same regardless of the operating system of the mobile device running the AirConnect™ App.

Once the Group Display computer 120 associated with the Group Display 110 is in the list displayed by the AirConnect™ App as shown in FIG. 4, the user of the MD may select a computer in operation 50, and then the AirConnect App can establish a connection between the MD device and the Display Computer, using the Machine Identifier associated with the name of the Group Display computer in the list. Once the connection is established, the Group Display computer 120 may tell the MD what resolution to stream in operation 60, up to a maximum resolution of the MD, and the desired content of the MD may be streamed to the selected computer as discussed below in detail with reference to FIG. 3B.

The Machine Information 122 regarding the selected computer may be saved on the mobile device 200a, 200b in operation 55. For example, if the user then leaves the room and disconnects and then returns, all of the initialization noted above may not need to be repeated.

Figure 5:
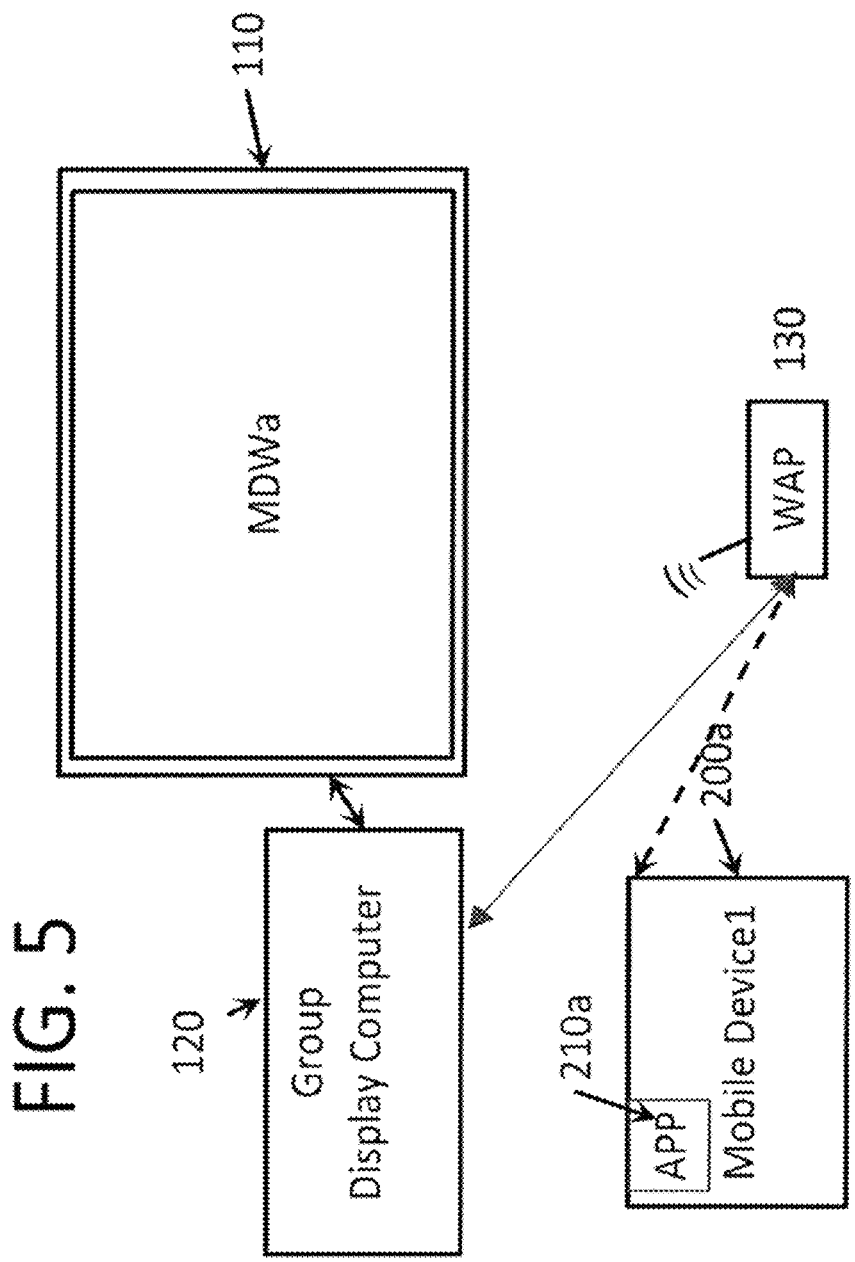
FIGS. 5 to 8 illustrate block diagrams of a display system in accordance with embodiments having a different number of mobile devices connected thereto.

Once a mobile device (MD) is connected to the Group Display Computer 120, the MDDS may occupy a MDW to match the aspect ratio of the MDDS. This MDW may occupy as much of the Group Display 110 as possible (See FIG. 5). The MDW may take up the entire screen if the MDDS has the same aspect ratio as the Group Display 110. When a second MDDS is connected, each MDW may have a same size and may maintain an aspect ratio (see FIG. 7) or may each occupy approximately half of the screen (see FIG.

Figure 8:
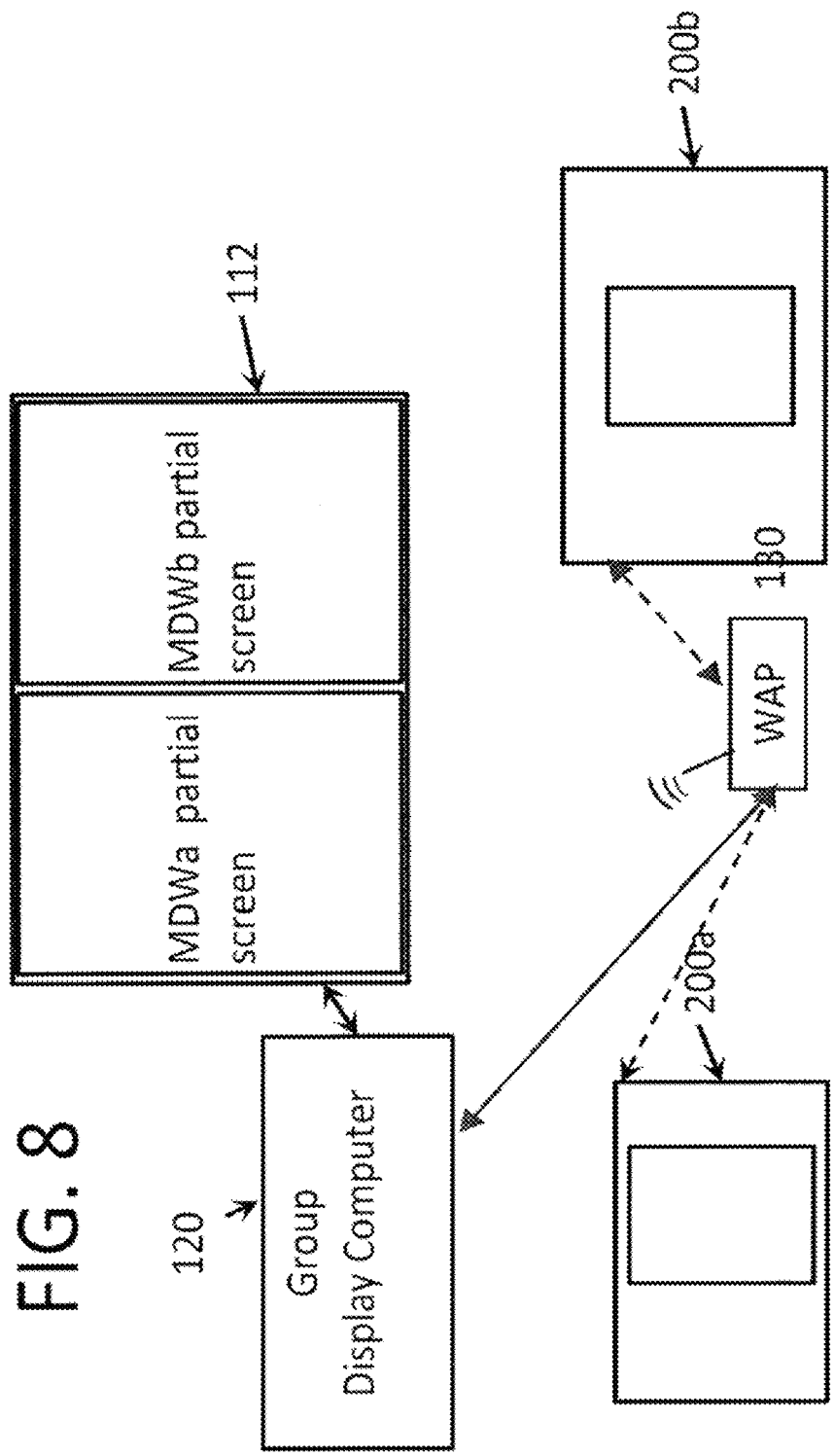

8). In FIG. 8, as the MDWs have a different aspect ratios than that of the mobile device, only a portion may be viewed. Similarly, when there are four MDWs, each MDW may occupy one quarter of the display region 112 (see FIG. 6). When more than a specific number (Maximum Viewable Streams (MVS)) of MDDS windows are displayed, then when subsequent new MDDS connections are made, the oldest MDDS connection may be dropped.

Figure 6:
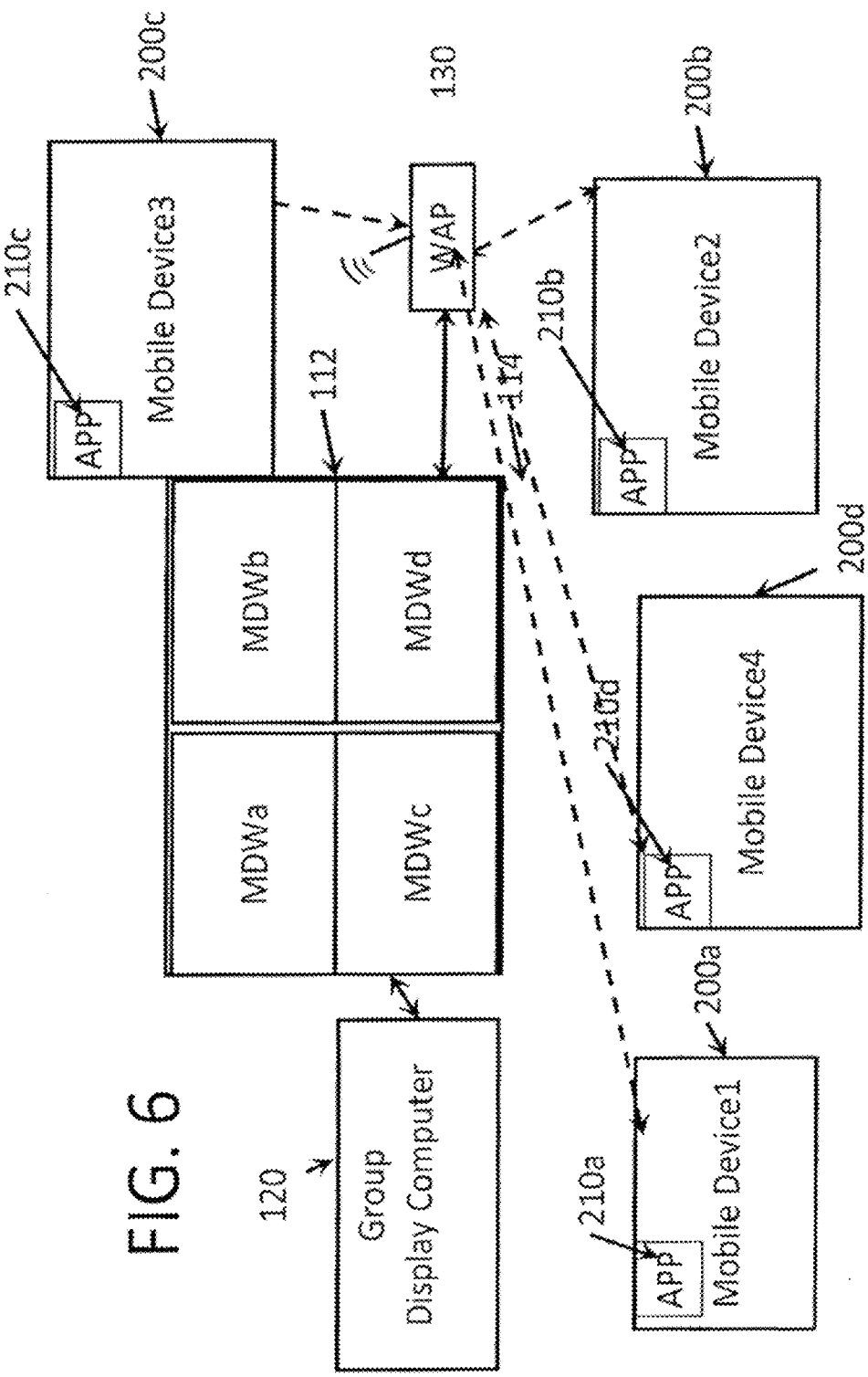

When the MDW covers the entirety of the common display 120, a full resolution, e.g., 1920×1080 resolution, may be used. When the MDW covers only ¼ of the screen, as shown in FIG. 6, the stream resolution may be reduced, e.g., 960×540 pixels. If the Group Display 110 includes a touch screen, a user may pinch/zoom the window smaller the stream resolution may be further reduced, e.g., 480×270 pixels. Thus, in accordance with a size of the MDW or reduced resolution on the Group Display 110 determined in operation 70, the Group Display Computer 120 may instruct the mobile device 200a, 200b to down sample the information to be transmitted to the Group display 110, in operation 75. This down sampling (Dynamic Resolution Scaling (DRS)) may increase the speed of the system and reduce network congestion.

If operation 90 determines that a mobile device is moved further than a predetermined distance from the Group Display 110 and is still connected thereto, a warning may be sent to the mobile device alerting the mobile device that it is about to be disconnected in operation 92. Such a warning may be audible, visible, and/or tactile. If a user selects to stay connected in operation 94, the connection may be maintained. If the user selects to disconnect in operation 94, the session may end in operation 96 and the mobile device is disconnected and disappears from the Group Display 110.

Figure 9:
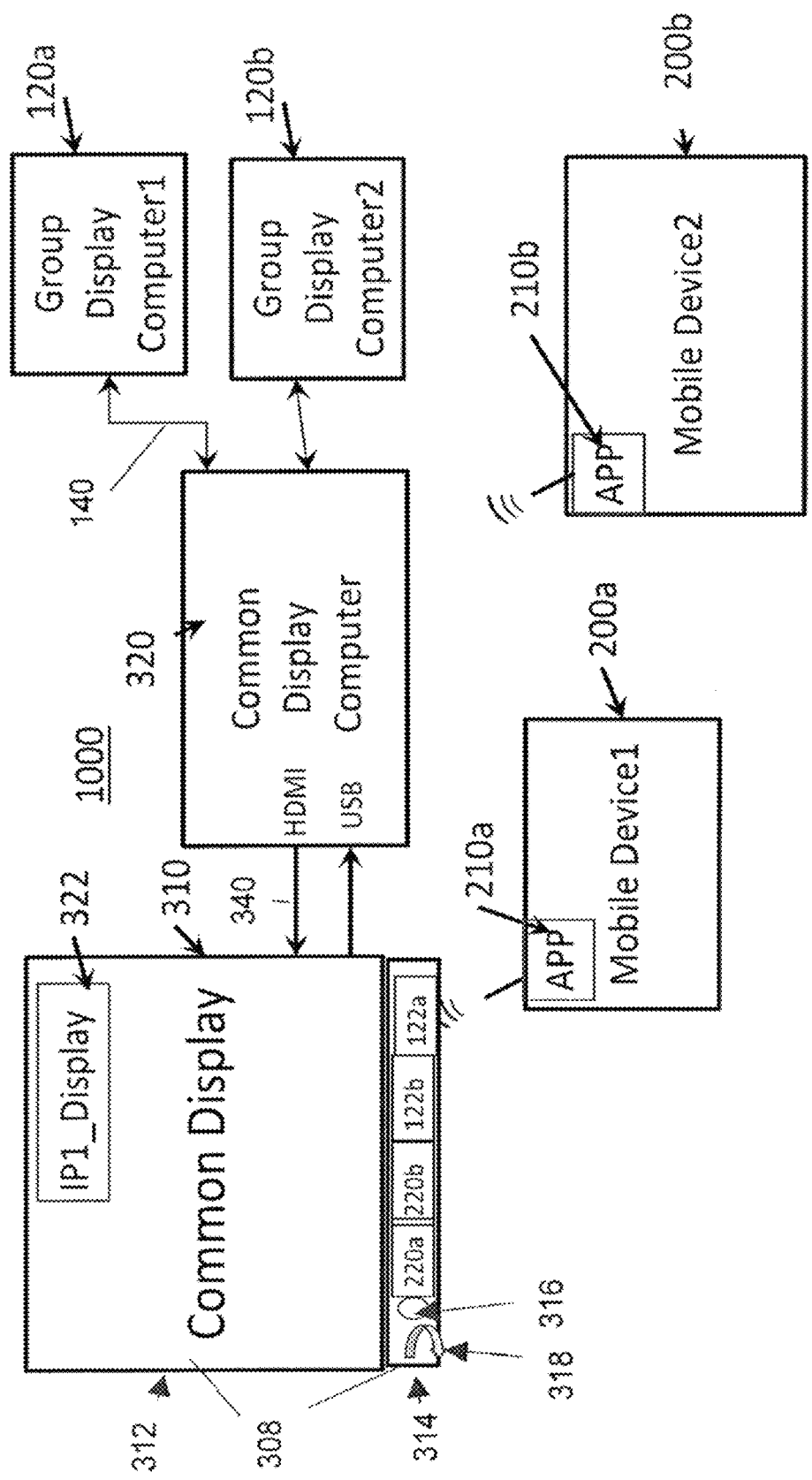
FIG. 9 illustrates a block diagram of a collaboration system in accordance with embodiments.

FIG. 9 illustrates a block diagram of the collaboration system 1000. The Common Display 310 may be an LCD display, LED display, or other monitor that is capable of having an electronic video signal as an input and converting the input to a visual image.

The Common Display 310 may include a display region 312 and a tray region 314, e.g., below the display region 312. The Common Display 310 may also include a touch sensor 308, e.g., overlaying an entirety of the Common Display 310, that it is sensitive to touch inputs including taps and gestures.

This digital information can be within windows, e.g., Group Device Windows (GDWs) or Mobile Device Windows (MDWs), e.g., editable windows, or on the entire screen of display region 312 of the Common Display 310. In addition, there may be windows displaying contents from group displays (GD) or mobile devices (MD) or other appropriate mobile device icons (MDI) 220a, 220b, or group display icons (GDI) 122a, 122b, e.g., a thumbnail of what is displayed on the mobile device or the group display, in the tray region 314 on the Common Display 310, e.g., at a lower region thereof. The tray region 314 may be a region on which the MDWs or GDWs cannot be zoomed and pinched, annotated, and so forth, but may be dragged, tapped or tossed onto the display region 312, e.g., to open an GDW or MDW corresponding to the GDI or MDI, and/or to received MDWs from the display region 312 to transmit that MDW to the mobile device corresponding to the MDI. The tray region 314 may include buttons, e.g., a broadcast button 316 to allow broadcasting of the common display or a restore button 318 to return to an original configuration.

Figure 10:
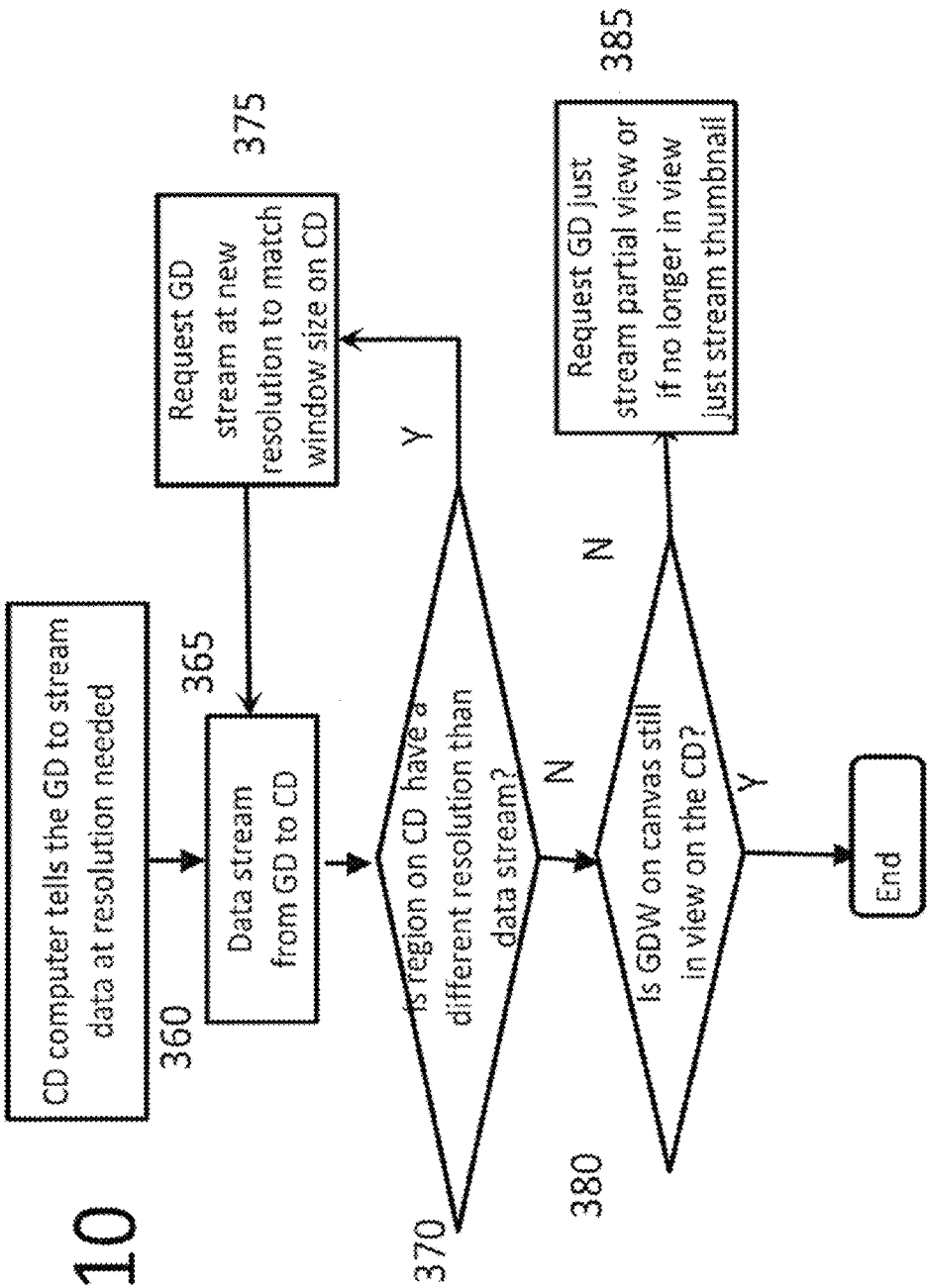
FIG. 10 illustrates a flowchart of using a collaboration system in accordance with embodiments.

FIG. 10 illustrates a flowchart of an operation of using the collaboration system 1000 in which mobile device have already been connected to and displayed on various Group Displays. Here, only two mobile devices and two Group Displays are illustrated for simplicity. Further, details of connecting the mobile device to the Common Display 310 are the same as for the Group Display 110 already discussed above in connection with FIGS. 3A and 3B, and will not be repeated.

An icon of a mobile device (Mobile Device icon or MDI) 220a. 220b, etc., or an icon of the Group Display (GDI) 122a, 122b, may be shown on the Common Display 310. e.g., in the tray region 314, and the MD or G) may stream data to the Common Display Computer 320, in operation 365, after receiving a resolution request from the Common Display Computer 320 in operation 360. The MDI or GDI could be either a graphic image or a thumbnail of a small live video stream of the MDDS of GDSS. The Common Display Computer 320 may tell the mobile device MD the resolution of the data stream needed for the MDI, e.g., 160×90, in operation 360.

In one operational mode (Standard Mode), to move Mobile Device data streams (MDDS) or Group Display data streams (GDDS) from the tray region 314 to the display region 312 of the Common Display 310 the MDIs or GDIs can be dragged by a user by a touch gesture on the Common Display touch sensor 308, e.g., a drag from the tray region 314 to the display region 312. Alternative methods of dragging the MDIs 220a. 220b and/or the GDIs 122a, 122b may include gesture recognition, voice recognition, or other user interface.

In another operational mode (AutoCanvas Mode) there is a virtual canvas (Canvas) that exists within the software on the Common Display Computer 320. The Canvas may be much larger than the physical display region 312 on the Common Display 310. Any section of the Canvas can be viewed on the display region 312. Suppose that, at first, the entire Canvas is viewed on the display region 312. Then by zooming into regions, a portion of the Canvas can be viewed. By pinching, zooming and panning with gestures on the touch sensor 316, a user can zoom into various regions of the Canvas to be shown on the display region 312.

The Canvas is a virtual region that expands to greater than the physical area of the display region 312 of the Common Display 310, e.g., any number of times the physical area up to infinite. The use of the Canvas allows additional files to be accessible and can be saved, but off the display region. Further discussion of the canvas may be found in U.S. Pat. No. 9,596,319 entitled "Simultaneous Input System for Web Browsers and Other Applications", which is hereby incorporated by reference in its entirety for all purposes.

Gestures, e.g., pan, zoom and pinch gestures, can be made to move and resize the scale of the Canvas, allowing the full canvas to be displayed or only a small section thereof. The system can be configured so that the MDW or GDW can be moved and manipulated. For example, if the Common Display 310 includes the touch sensor 308, then touch gestures such as pan, zoom and pinch may be used to move and/or resize the MDWs or CDWs. Snapshots of the MDWs or GDWs can be taken from the Common Display 310 with the use of touch gestures. Annotations could be performed on the MDWs or GDWs. Further details may be found, e.g., in U.S. Pat. No. 9,596,319.

In the Standard Mode, if a Canvas is used, and a user drags an MDI or GI in to the display region 312 of the Common Display 310, then at this point, the user can zoom the MDDS window or can zoom the Canvas to make the MDDS window to fill most of the display region 312. Then, if the user pans the Canvas, so that the MDDS window is off-screen, then the MDDS will not be visible on the display region 312.

In AutoCanvasMode, when the first MD or GD is connected, the MDW or GDW may be automatically placed onto the center of the Canvas and the Canvas may be automatically zoomed in such that the MDW or GDW fills most of the display region 312. When a second connection is made, the second window may be automatically placed onto an empty section of the canvas (typically next to the first MDW or GDW) and the Canvas may be automatically panned and zoomed to view only the second window. To see both windows side by side, the user can pinch, zoom and pan the Canvas and/or the window. The window may be sized to the same aspect ratio of the MDDS or ODDS (or the MD or GD screen). Alternatively, all GDIs displaying something thereon may be displayed in the display region automatically, e.g., in a grid.

The MDDS or ODDS from mobile devices or Group Display Computers 120 may be displayed in individual window on the common display region 312. When they are editable windows, each window may be moved, expanded and or resized, for example through the use of touch or other gestures. As the size of a window on the Common Display 310 changes, different resolutions may be used within the window. When the window covers the entirety of the Common Display 312, a full resolution. e.g., 1920×1080 resolution may be used. When the window covers only ¼ of the screen, the stream resolution may be reduced, e.g., 960×540 pixels, and if the user zooms the window smaller the stream resolution may be further reduced, e.g., 480×270 pixels.

Thus, in accordance with a size of the window or reduced resolution on the Common Display 310 determined in operation 370, the Common Display Computer 320 may instruct the mobile device 200a, 200b or Group Display 100a, 100b, to down sample the information to be transmitted to the Common Display 310, in operation 375. This down sampling (Dynamic Resolution Scaling (DRS)) may increase the speed of the system and reduce network congestion. Also when a window is moved off of the viewable Canvas, the Common Display Computer 320 may instruct the MD or GD to only send the resolution and frame rate (e.g., 160×90 pixels @ 1 frame per 2 seconds) needed to render the MDI or GDI in the tray 314, since this will be the only visible representation of the MDDS or GDDS.

For example, the Common Display Computer 320 may determine, in operation 370, a first resolution (R1) of the data stream sent to the Common Display Computer 320 and whether a region, e.g., the tray region 314 or an window in the display region 312, in which the data stream is to be presented and a second resolution (R2) associated with that region is different than the first resolution R1. When R2 is less than R1, the Common Display Computer 320 may request, in operation 375, a third resolution (R3) to the device, where R1>R3>=R2, and the AirConnect™ App on the mobile device or the presentations software on the Group Display Computer 110 is to down sample the selection in accordance with the resolution, R3, and only transmitting the down sampled resolution (R3) to the Common Display Computer 320. Alternatively, the Common Display Computer 320 may automatically tell the Group Display Computers 120 what resolution to transmit.

When the window on Common Display is a GDW from Group Display Computer 120, there may be sub-windows, e.g., each associated with a different mobile device. These sub-windows may have been down sampled, as discussed above in connection with FIG. 3B. Thus, the sub-windows may be down sampled twice; once by the mobile device and then a second time by the Group Display Computer 120. Alternatively, the Group Display Computer 120 could receive the full MDDS, down sample the MDDS, and display the down sampled images in MDWs on the Group Display 110. Then, when the Group Display Computer 120 sends the display data to the Common Display Computer 320, the Group Display Computer 120 will down sample the image data again.

Additionally, in DRS mode when the GDW or MDW is expanded on the touchscreen 316, the Common Display Computer 320 may at first expand the content to fill the GDW or MDW, even though sufficient resolution cannot be displayed. At the same time, the Common Display Computer 320 may request, in operation 375, the MD through the sharing application or the Group Display Computer 120 through the presentation software to transmit the MDDS or GDDS at a higher resolution. The net result will be that as the GDW or MDW is expanded it will first appear slightly blurry as it expands and then, as the higher resolution is received, it will fill in the MDW or GDW to show the MDDS or GDDS at the resolution needed to match the window. Alternatively, the Common Display Computer 320 may request a resolution larger than needed for the window from the mobile device or the Group Display, but not as large as the full resolution of the display region 312, e.g., to smooth the transition to a larger image.

In contrast, in Full Resolution Mode (FRM), when a MD or GD first connects to the display computer, it sends its MDDS or GDDS at the full resolution of that data stream displayed thereon. FRM is described, e.g., in U.S. Pat. No. 9,596,329, in which the full resolution of the MDDS or GDDS is stored on the display computer and down sampled to the size needed for the window. Then, as the window is expanded the down sampling is reduced. While the FRM may allow for the resolution to be quickly changed as the window is expanded, FRM may slow down the system, when multiple MDDS or GDDS are simultaneously being transmitted.

In a typical mode of operation there may be eight Group Display systems in a classroom, as shown in FIG. 1. The Common Display may be displaying GDWs of all eight Group Display systems. Students may be seated by each Group Display and a teacher may operate the Common Display. In FIG. 1, there are seats for six students near each Group Display. Consider a first Group Display System 100a. Each of the six students seated at the table near Group Display 100a may have a mobile device running the sharing application. If the MVS on Group Display 100a is set to four, then the content from up to four of these mobile devices will be displayed on Group Display 100a, e.g. in a quad mode format, as shown in FIG. 6. All eight Group Displays may be set to this same MVS and all eight of these Group Displays may all be in quad mode, all displaying the content from the mobile devices from four students.

The Group Display computers 120a-120h and the Common Display computer 320 may be configured so that on start-up, all of the Group Display computers auto-connect to the Common Display Computer or only those Group Display computers actually displaying something may be automatically connected, e.g., the GDIs may be displayed in the tray region 314. The Common Display 310 may include inputs, e.g., buttons, that allow different modes of operation, e.g., in the tray region 314. One mode of operation could be an Initial Classroom mode. In this mode, the Common Display Computer 320 could place the contents from each Group Display Computer 120 connected to the Computer Display Computer 320 into its own individual GDW. In this manner all eight GDWs would be displayed on the Common Display 310, i.e., in the display region 312, not the tray region 314. The user could then zoom in to the canvas to display only a subset of these eight GDWs, e.g., two of them. In this case, the other six GDWs would still be on the virtual canvas, but would be located off-screen, i.e., not visible. Scrolling through the canvas, would allow the teacher to quickly look at all 8 GDWs. The user could then arrange the GDWs by pinching, zooming, and dragging the GDWs.

Data displayed on the Common Display 310 may be broadcast to the Group Displays Computers 120 and/or mobile devices. One option for this is to establish a separate peer-to-peer connection from each Group Display Computer 120a-120h to the Common Display Computer 320. However, this will require a great deal of processing power on the Common Display Computer 320 and could cause the responsiveness of the collaboration system to slow down. So while any computer on the network may serve to broadcast, one manner to speed up the response of the system is to use a separate Broadcast server 400, as shown in FIG. 13. This Broadcast server 400 may be connected on either side of the network switch 350 in FIG. 1. The Common Display Computer 320 may send one stream to the Broadcast server 400. Then the Common Display Computer 320 then contacts each Group Display Computers 120 (or mobile device) and directs it to get a video data stream from the Broadcast server 400. Then, each Group Display computer 120 can capture the same video data stream from the Broadcast Server 400 and display it on the associated Group Display 110.

In this manner, either the entire content displayed on the Common Display 310 can be broadcast or a single item, e.g., window, on the Common Display can be broadcast.

Alternatively to broadcasting an entirety of the Common Display 310, any single GDW or MDW could be broadcast. For example, each GDW or MDW may include a band, e.g., a Group Display band GDB1 and GDB2 of FIGS. 11 and 12, that may include a broadcast button, an annotation button, a snapshot button and restore button discussed above in connection with the tray region 314 of the Common Display 320.

Figure 11:
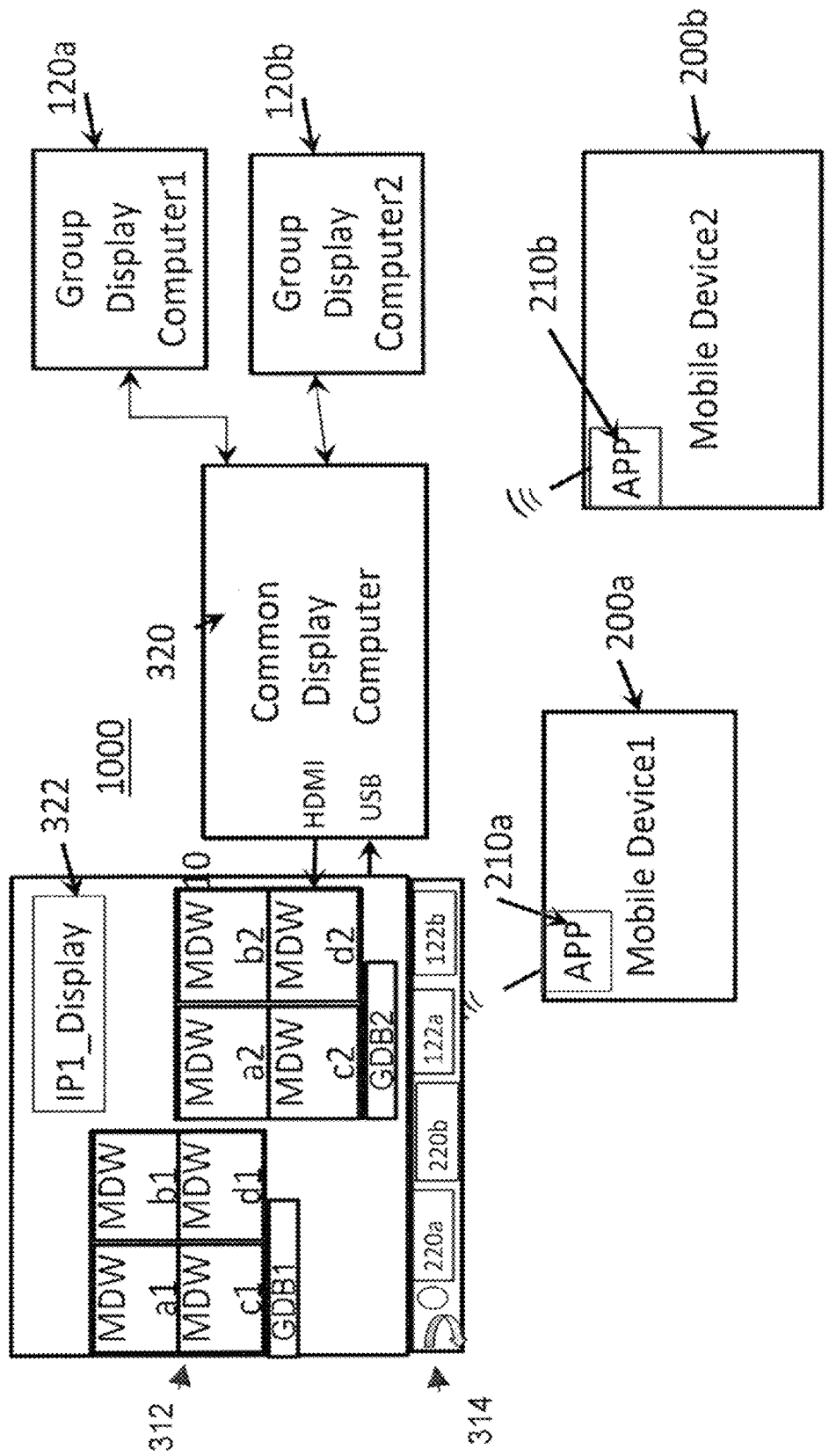
Figure 12:
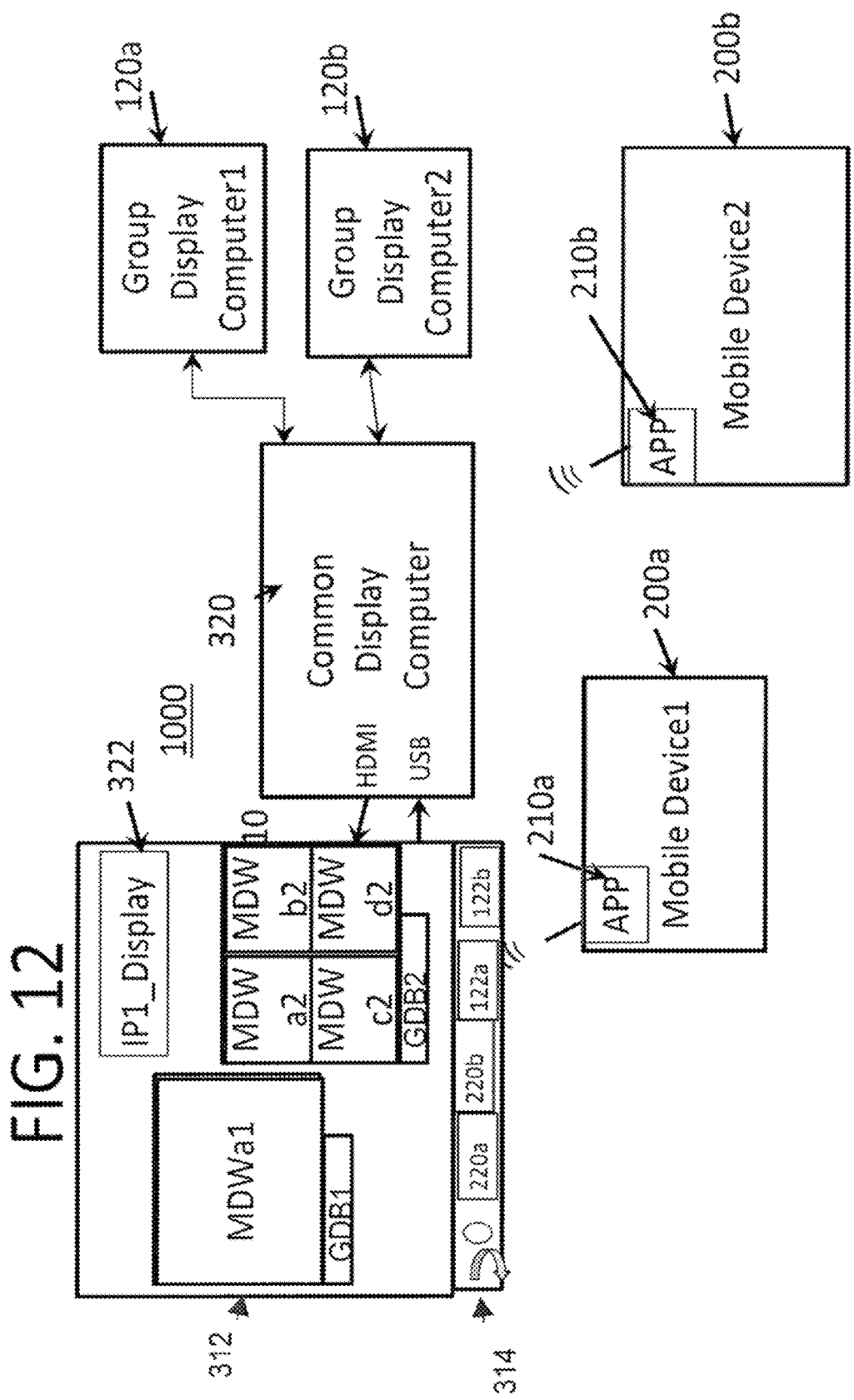

Further, each GDW may have multiple modes of operation. As disclosed in the patent and patent applications noted above, each GDW may have at least two modes of operation: one mode allows dragging, pinching and zooming of the GDW and a second mode of operation that allow for operation within the GDW (e.g. annotation, taking a snapshot of the GDW, etc.). When the GDW is in the first mode of operation, tapping on the GDW may convert it to the second mode. Typically a frame or bar GDB will be displayed around the GDW to indicate that it is in the second mode of operation, as illustrated in FIGS. 11 and 12. The frame may contain icons to indicate allowable actions on the GDW.

In addition to the allowable actions discussed previously for an MDW, as disclosed in detail in the patents and patent applications noted above, additional allowable actions for the GDW may include a Broadcast function, a "Switch Group Display Mode" function and a Particular Group Display Transmit function. The Broadcast function may be enabled by tapping a Broadcast icon within the frame around a GDW. Once the Broadcast function is enabled, the Common Display Computer may then send the contents of the particular associated GDW, in the form of a Specific Data Stream (SDS) to all Group Display Computers connected in the Common Display Computer 320 and instruct each Group Display Computer 120a-120h to display the SDS on the associated Group Display. In this way, the user is able to select a particular GDW and broadcast its contents to all Group Displays in the room. If the user annotates on a GDW and then broadcasts the GDW, then the annotation may also be included in the SDS and therefore also be displayed on all of the Group Displays.

Broadcasting of a window may be performed on a live window or a snapshot of a window. In either case, if the user of the Common Display Broadcasts a window to the Group Displays, they can then work (e.g. annotate) on another item on the canvas or another part of the canvas without affecting the Group Displays. If the teacher (the user at the Common Display) broadcasts a live GDW, then the users at the Group Displays (the students) will see any annotations made by the teacher in real time, which is sometimes desirable. On the other hand, sometimes it is desirable for the teacher to draw on an item and not send it to the Group Displays until ready. In this case, the teacher can broadcast a snapshot of a GDW and then annotate on the same GDW and broadcast when annotation is completed.

If a particular Group Display function is enabled, this may work similarly to the Broadcast function, except that with this function, the teach may be able to send the SDS to only a subset of the Group Displays or to a particular Group Display or to only the Group Display corresponding to the particular GDW. For example, in the frame around the GDW for Group Display 100a there may be an icon. e.g., in the Group Display band GB1, indicating to "Transmit to Sender". The teacher may annotate on the GDW1 for Group Display 100a and then tap on the "Transmit to Sender" icon and then the contents of the GDW1 may be sent via an SDS to Group Display Computer 120a and then the SDS may only be displayed on Group Display 110a.

The Switch Group Display mode, may allow a user (e.g. the teacher) to switch the mode of a particular Group Display 100a, for example from quad mode (FIG. 6) to single user mode (FIG. 5) from the Common Display 310. It may allow the user to change the MVS of a particular Group Display 100a. One option to change this mode would be to add an icon to the band of the GDW once tapped. Another option is to auto-invoke this mode (Auto Switch Group Display mode). For example, once a particular GDW is tapped, the band GDB could appear around the GDW. At this point, suppose the corresponding Group Display is in quad mode (MVS of 4) and four different windows are displayed on the Group Display, each displaying a different MDW on the Group Display. Then within the GDW on the Common Display 310, the GDW will be further subdivided into four different sub-windows, each sub-window corresponding to one of the MDWs on the Group Display.

If the Auto Switch Group Display mode is in operation, then just tapping within the GDW may switch the mode of the corresponding Group Display from quad mode to single mode. The Common Display Computer 320 may send a signal in this case to the corresponding Group Display Computer 120 causing the Group Display Computer 120 to display only a single MDW and expand it to fill the entire Group display. At the same time, the Common Display Computer 320 may also change the contents of the GDW to fill the GDW with the contents of one of its sub-windows—the one corresponding to the same single MDW on the Group Display, so that the GDW is still mirroring the content on the Group Display 120.

Further if the user taps on a particular sub-window within the GDW, this can be the particular sub-window that is expanded within the GDW and the corresponding MDW on the Group Display 120 that is expanded on the Group Display 120. If the teacher than taps a second time anywhere within the GDW on the Common Display 310, this may return the Group Display 120 and the GDW back to its previous state (quad mode).

When connected to a Group Display system 100, each window for the Group Display system 100 on the Common Display Region 312 could show the content of a number, e.g., up to four, mobile devices, as shown in FIGS. 11 and 12. The Group Display 110 may be controlled by the Common Display 310, e.g., by selecting a window within the GDW, e.g., a sub-window, both the GDW and the Group Display 110 may go from a quad mode (see FIGS. 6 and 11) to single mode (see FIGS. 5 and 12). By tapping in that GDW again, the original configuration, e.g., quad mode, will be restored on both displays. Changes made to a window on the Common Display 310, e.g. annotations, may be broadcast to all Group Displays automatically, may be broadcast automatically only an associated Group Display or to a mobile device associated with a MDW or sub-window in the GDW, or MDW or GDW may be tossed to a broadcast area or off screen to send the changes to all stations, e.g., all directly connected mobile devices and Group Displays in the session.

As shown in FIG. 13, the system 1000 may include a remote control device 500, e.g., a table, that allows a user to do everything that can be done on the Common Display 310. In particular, the remote control device 500 would be in communication with the Common Display Computer 320 over the WAP 130 and would mirror what is on the Common Display 310 and may just forward touch events thereon to the Common Display Computer 320, e.g., may allow to zoom in or pinch out to remotely control the Common Display 310.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A collaboration system, including processors and a memory, comprising:
    a first display and a first display computer, the first display computer to receive a first mobile device data stream from a first mobile device of at least two mobile devices over a wireless access protocol and a second mobile device data stream from a second mobile device of the at least two mobile devices over a wireless access protocol, the first display computer to request the first mobile device data stream of a first predetermined resolution to the first mobile device of the at least two mobile devices and the second mobile device data stream of a second predetermined resolution to the second mobile device of the at least two mobile devices, the first display computer to output a first display data stream over a network, the first display data stream combining the first and second mobile device data streams from the at least two mobile devices;
    a second display and a second display computer, the second display computer to receive a third mobile device data stream from a third mobile device of the at least two mobile devices, different from the first and second mobile devices, over the wireless access protocol, and a fourth mobile device data stream from a fourth mobile device of the at least two mobile devices over the wireless access protocol
    the second display computer to request a data stream of a third predetermined resolution to the third mobile device of the at least two mobile devices,
    and the fourth mobile device data stream of a fourth predetermined resolution to the fourth mobile device of the at least two mobile devices,
    the second display computer to output a second display data stream over a network, the second data stream combining the third and fourth mobile device data streams from the at least two mobile devices; a third display and a third display computer running a virtual canvas larger than a display region of the third display; and circuitry configured to receive the first and second display data streams from the network, combine the first and second display data streams into a single data stream, and send the single data stream to a server, separate from the collaboration system, to the virtual canvas on the third display computer and to display the first and second display data streams in first and second editable display windows, respectively, on condition that the first and second editable display windows on the virtual canvas are in the display region of the third display, on the third display, and on condition that one of the first and second editable display windows on the virtual canvas is not in the display region of the third display, the third display computer is to request a corresponding one of the first and second display computers to down sample a corresponding one of the first and second display data streams to the circuitry.

2. The collaboration system as claimed in claim 1, wherein the circuitry is configured to broadcast data in the first display window to the second display computer or data in the second display window to the first display computer.

3. The collaboration system as claimed in claim 1, wherein the circuitry is configured to broadcast a first window on the third display to the first and second displays.

4. The collaboration system as claimed in claim 1, wherein the first window on the third display is one of the first and second display windows.

5. The collaboration system as claimed in claim 1, wherein the third display computer is to select which of the first and second display windows dominate the third display.

6. The collaboration system as claimed in claim 1, wherein the third display computer is further configured to receive a mobile device data stream from a mobile device, different from the first and second mobile devices streaming to the first display and the third and fourth mobile devices streaming to the second display, wherein the circuitry is configured to combine the mobile device data stream with the first and second display data streams into the single data stream.

7. A collaboration system, comprising:
N group displays and N group display computers, where N is a natural number greater than one, each of the group display computers capable of receiving mobile device data streams from at least M mobile devices, different from mobile devices of other display computers, where M is a natural number greater than one, over a wireless access protocol, each of the N group display computers to request a data stream of a predetermined resolution to each of the at least M mobile devices, and to output a group display data stream over a network, the N group display data stream combining mobile device data streams from the at least M mobile devices;
a common display and a common display computer running a virtual canvas larger than a display region of the common display; and
circuitry configured to
receive the N group display data streams from the network,
combine the N group display data streams into a single data stream, and
send the single data stream to a server, separate from the collaboration system, to the virtual canvas on the common display computer and to display data from the N group display computers in N editable display windows, respectively, and, on condition that an N editable display window on the virtual canvas are in the display region of the common display, on the common display, wherein
on condition that an N editable display windows on common virtual canvas is not in the display region of the common display, the third display computer is to request a corresponding N group display computers to down sample a corresponding N group display data streams to the circuitry.

8. The collaboration system as claimed in claim 7, wherein the circuitry is configured to broadcast data in a first display window of the N display windows on the common display to a second group display computer of the N group display computers or data in a second display window of the N display windows on the common display to a first group display computer of the N group display computers.

9. The collaboration system as claimed in claim 7, wherein the circuitry is configured to broadcast a first window on the common display to the N displays.

10. The collaboration system as claimed in claim 9, wherein the first window on the common display is one of the N display windows.

11. The collaboration system as claimed in claim 7, wherein the common display computer is to select which of the N display windows dominate the common display.

12. The collaboration system as claimed in claim 7, wherein the common display computer is further configured to receive a mobile device data stream from a mobile device, different from the M mobile devices streaming to the N group display computers, wherein the circuitry is configured to combine the mobile device data stream with the N group display data streams into the single data stream.

13. A method of connecting a mobile device to a first display associated with a first display computer controlling the first display and running a virtual canvas larger than a display region of the first display, via one of a second display computer associated with a first display computer having presentation software, including, for each mobile device:
downloading a display application onto the mobile device; selecting the second display computer in the display application; connecting the mobile device to the second display computer;
selecting, on the mobile device, what is to be displayed on the second display;
sending a data stream of the selection on the mobile device to the second display computer to be displayed in a window on the selected display corresponding to the mobile device;
connecting at least one other mobile device to the second display and sending at least one other data stream from the at least one other mobile device to the second display;
combining the data stream from the mobile device and the at least one other data stream into a single data stream;
sending the single data stream, via a server, separate from the second display computer, to the virtual canvas running on the first display computer;
displaying the data stream and the at least one other data stream in corresponding editable display windows;
determining a data stream from the at least one other mobile device is not displayed in the display window on the first display;
requesting, by the second display computer, a mobile device, corresponding to the determined data stream, to send a down sampled version of the determined data stream to the second display computer.

14. A method as claimed in claim 13, wherein the first display computer is further configured to receive a mobile device data stream from a mobile device, different from the more than one mobile device streaming to the second display computers, the method further comprising combining the mobile device data stream with the single data stream to create an updated single data stream to be sent to the first display computer.

15. A non-transitory computer readable storage device having computer readable instructions that when executed by circuitry cause the circuitry to:
receive a first data stream from a first display computer, the first display computer to receive mobile device data streams from at least two mobile devices over a wireless access protocol, the first display data stream combining mobile device data streams from the at least two mobile devices;
receive a second data stream from a second display computer, the second display computer to receive mobile device data streams from at least two mobile devices, different from the at least two mobile devices streaming to the second display computer, over a wireless access protocol, second display data stream combining mobile device data streams from the at least two mobile devices;
combine the first and second display data streams into a single data stream; and
send the single data stream to a server, separate from the first and second display computers, wherein a third display computer running a virtual canvas larger than a display region of a third display in communication with the third display computer is configured to receive the single data stream from the server on the virtual canvas and to display data from the first and second display computers in first and second editable display windows, respectively, on a third display and, on condition that the first and second editable display windows on the virtual canvas are in the display region of the third display, on the third display, and on condition that one of the first and second editable display windows on the virtual canvas are not in the display region of the third display, the third display computer is to request a corresponding one of the first and second display computers to down sample a corresponding one of the first and second display data streams to the circuitry.

16. The A non-transitory computer readable storage device as claimed in claim 15, wherein the third display computer is further configured to receive a mobile device data stream from a mobile device, different from the at least two mobile devices streaming to the first display and the at least two mobile devices streaming to the second display, cause the circuitry to combine the mobile device data stream with the first and second display data streams into the single data stream.

* * * * *